United States Patent
Lok et al.

(10) Patent No.: US 7,908,404 B1
(45) Date of Patent: Mar. 15, 2011

(54) METHOD AND SYSTEM FOR MANAGING NETWORK AND STORAGE DATA

(75) Inventors: Ying P. Lok, Ladera Ranch, CA (US); Shashank Pandhare, Aliso Viejo, CA (US); Arun Mittal, Mission Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 299 days.

(21) Appl. No.: 12/052,130

(22) Filed: Mar. 20, 2008

Related U.S. Application Data

(60) Provisional application No. 60/986,812, filed on Nov. 9, 2007.

(51) Int. Cl.
G06F 3/00 (2006.01)
G06F 13/00 (2006.01)

(52) U.S. Cl. .............. 710/5; 710/33; 709/212; 711/154; 711/156

(58) Field of Classification Search .................. None
See application file for complete search history.

(56) References Cited

U.S. PATENT DOCUMENTS

| | | | | |
|---|---|---|---|---|
| 5,978,815 | A * | 11/1999 | Cabrera et al. ...................... | 1/1 |
| 6,470,397 | B1 * | 10/2002 | Shah et al. .................... | 709/250 |
| 6,795,824 | B1 * | 9/2004 | Bradley ................................ | 1/1 |
| 7,370,174 | B2 * | 5/2008 | Arizpe et al. ................. | 711/206 |
| 7,720,064 | B1 * | 5/2010 | Rohde ............................ | 370/389 |
| 7,730,221 | B2 * | 6/2010 | Diamant et al. .................. | 710/1 |
| 2001/0037406 | A1 * | 11/2001 | Philbrick et al. .............. | 709/250 |
| 2004/0030770 | A1 * | 2/2004 | Pandya .......................... | 709/223 |
| 2004/0064590 | A1 * | 4/2004 | Starr et al. ..................... | 709/250 |
| 2005/0138184 | A1 * | 6/2005 | Amir ............................. | 709/228 |
| 2005/0237434 | A1 * | 10/2005 | Takatori et al. ............... | 348/725 |
| 2006/0101130 | A1 * | 5/2006 | Adams et al. .................. | 709/218 |
| 2006/0242382 | A1 * | 10/2006 | Griess et al. .................. | 711/170 |
| 2006/0248378 | A1 * | 11/2006 | Grcanac et al. .................... | 714/6 |
| 2007/0174850 | A1 * | 7/2007 | El Zur ........................... | 719/321 |
| 2007/0245060 | A1 * | 10/2007 | Lakkavalli .................... | 711/100 |
| 2008/0028096 | A1 * | 1/2008 | Henderson et al. ........... | 709/236 |
| 2008/0056300 | A1 * | 3/2008 | Williams ...................... | 370/466 |
| 2009/0034522 | A1 * | 2/2009 | Hayes et al. .................. | 370/389 |
| 2009/0265516 | A1 * | 10/2009 | Prabhu et al. ................. | 711/161 |

* cited by examiner

*Primary Examiner* — Henry W Tsai
*Assistant Examiner* — Michael Sun
(74) *Attorney, Agent, or Firm* — Klein, O'Neill & Singh, LLP

(57) ABSTRACT

Method and system for processing storage and network packets is provided. The system includes a computing system executing a storage application for sending an input/output request for communicating with a storage device, the storage application transmits the I/O request to a storage driver that includes (a) an operating system interface to communicate with an operating system executed by the computing system and (b) a storage protocol interface that executes operations related to the storage protocol for processing the I/O request; wherein the storage driver sends the I/O request to a network driver that encapsulates the I/O request into a combined network and storage packet; and the encapsulated network and storage packet is transmitted via a network link using a network protocol.

18 Claims, 14 Drawing Sheets

| Ethernet Header 302 | SOF 304 | FCOE Length 306 | FC Header 308 | Pay Load 310 | CRC 312 | EOF 314 |
300
FIG. 3
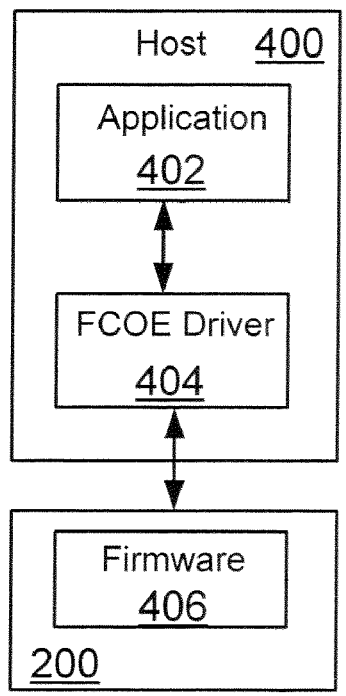
FIG. 4A
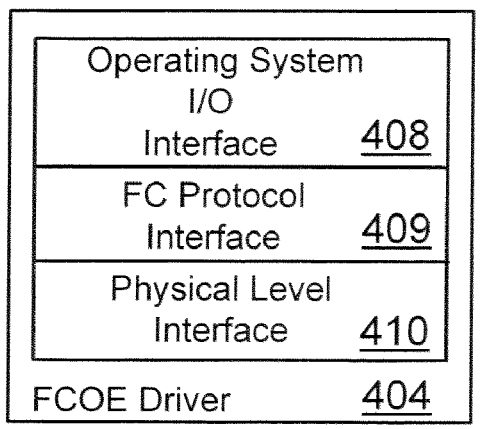
FIG. 4B

METHOD AND SYSTEM FOR MANAGING NETWORK AND STORAGE DATA

CROSS-REFERENCE TO RELATED APPLICATIONS

This application claims priority to U.S. Provisional Patent Application 60/986,812 filed on Nov. 9, 2007, the disclosure of which is incorporated herein by reference in its entirety.

BACKGROUND

1. Technical Field

This disclosure is related to network and storage systems.

2. Related Art

Computer networks are commonly used to share stored information. Different protocols may be used to handle network information and storage information. It is desirable to integrate the various processes and systems involved in handling both network and storage protocols.

SUMMARY

In one embodiment, system for processing storage and network packets is provided. The system includes a computing system executing a storage application for sending an input/output request for communicating with a storage device, the storage application transmits the I/O request to a storage driver that includes (a) an operating system interface to communicate with an operating system executed by the computing system and (b) a storage protocol interface that executes operations related to the storage protocol for processing the I/O request; wherein the storage driver sends the I/O request to a network driver that encapsulates the I/O request into a combined network and storage packet; and the encapsulated network and storage packet is transmitted via a network link using a network protocol.

In another embodiment, a method for sending storage packet encapsulated within a network packet is provided. The method includes receiving an input/output (I/O) request from an application executed by a computing system; wherein the I/O request is received by a storage driver; performing storage protocol related operations for the I/O request, wherein a storage protocol interface formats the I/O request; encapsulating the I/O request in a combined network and storage packet; wherein a network driver performs the encapsulation; and transmitting the encapsulated packet via a network link.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIG. 3 shows an example of a Fibre Channel Over Ethernet (FCOE) header, used according to one embodiment;

FIG. 4A shows an example of a software architecture, used according to one embodiment;

FIG. 4B shows an example a FCOE driver, used according to one embodiment;

DETAILED DESCRIPTION

To facilitate an understanding of the various embodiments, the general architecture and operation of a networking system will be described. The specific architecture and operation of the various embodiments will then be described with reference to the general architecture.

Network System

Figure 1:
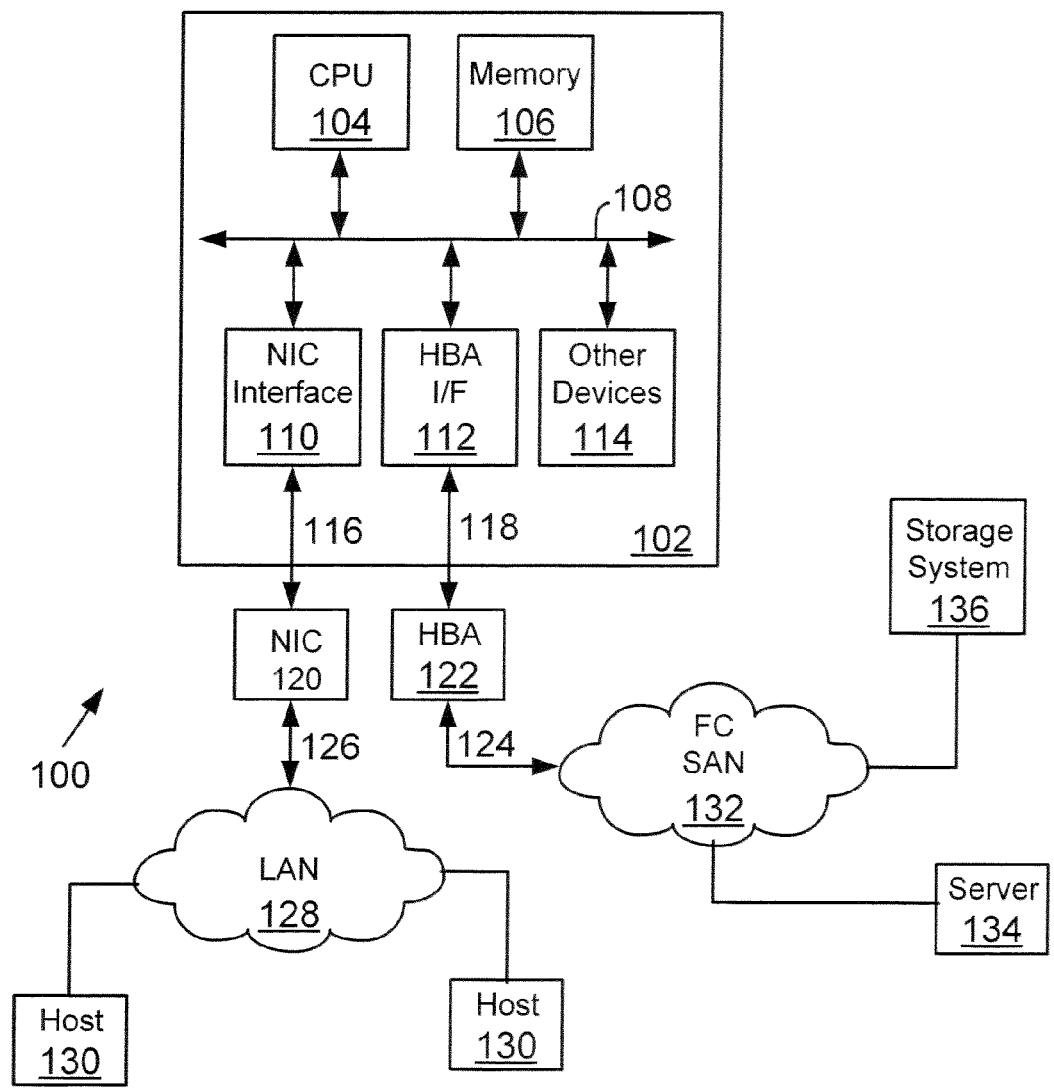
FIG. 1 shows a block diagram of a system according to one embodiment.

FIG. 1 shows a block diagram of a generic network system 100, which includes a computing system 102 that can communicate with a plurality of network devices and/or storage devices. Computing system 102 typically includes several functional components. These components may include a central processing unit (CPU) 104, main memory 106, network interface (NIC Interface) 110, a host bus adapter (HBA) interface (HBA I/F) 112 and other devices (for example, input/output ("I/O") devices) 114.

In a conventional computing system 102, the main memory 106 is coupled to the CPU 104 via a system bus 108 or a local memory bus (not shown). The main memory 106 is used to provide the CPU 104 access to a and/or program information that is stored in main memory 106 at execution time. Typically, the main memory is composed of random access memory (RAM) circuits. A computer system with the CPU and main memory is often referred to as a host system.

Network interface 110 is coupled to a network interface card 120 via a bus/link 116 (used interchangeably through out this specification). NIC 120 handles incoming (receive) and outgoing (transmit) network traffic from computing system 102 via link 126. The term incoming means network traffic that is received by NIC 120 (for example, from another host system 130 coupled to a local area network (LAN) 128). The term outgoing means network traffic that is transmitted by NIC 120 for computing system 102 to another network device (e.g. host system 130 or server 134).

Various network protocols may be used by NIC 120 to handle network traffic. One common network protocol is Ethernet. The original Ethernet bus or star topology was developed for local area networks (LAN) to transfer data at 10 Mbps (mega bits per second). Newer Ethernet standards (for example, Fast Ethernet (10 Base-T) and Gigabit Ethernet) support data transfer rates between 100 Mbps and 10 gigabit (Gb). The description of the various embodiments described herein are based on using Ethernet (which includes 10 Base-T and/or Gigabit Ethernet) as the network protocol, however, the adaptive embodiments disclosed herein are not limited to any particular protocol, as long as the functional goals are met by an existing or new network protocol.

Host system 102 uses HBA 122 to communicate with storage systems, for example, 136 coupled to a storage area network (SAN or FC SAN) 132. Link 124 couples HBA 122 to SAN 132. The transfer rate for link 124 continues to increase for example, from 1 Gb to 10 Gb.

In SANs (for example, 132), plural memory storage devices are made available to various host computing systems. Data in a SAN is typically moved between plural host systems and storage systems (or storage devices, used interchangeably throughout this specification) through various controllers/adapters, for example, HBA 122.

One common standard that is used to access storage systems in a SAN is Fibre Channel. Fibre channel is a set of American National Standard Institute (ANSI) standards, which provide a serial transmission protocol for storage and network protocols such as HIPPI, SCSI, IF, ATM and others.

Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The fibre channel fabric topology allows several media types to be interconnected.

Fibre Channel fabric devices include a node port or "N_Port" that manages Fabric connections. The N_port establishes a connection to a Fabric element (e.g., a switch) having a fabric port F_port.

Host systems often communicate with peripheral devices (for example, HBA 12 via bus 118) via an interface/bus such as the Peripheral Component Interconnect ("PCI") interface, PCI-X and/or PCI-Express (incorporated herein by reference in its entirety) bus.

One challenge with conventional systems has been the use of separate NICs and HBAs. Separate NICs and HBAs use complex software code, which makes the use of storage and network protocols expensive and cumbersome. In one embodiment, a structure is proposed to simplify the use of network and storage protocols.

The adaptive aspects of the present disclosure, described herein are based on using the Ethernet and Fibre Channel protocols, however, any other network and storage protocol may be used to implement the various embodiments described herein.

Network/Storage Adapter

Figure 2:
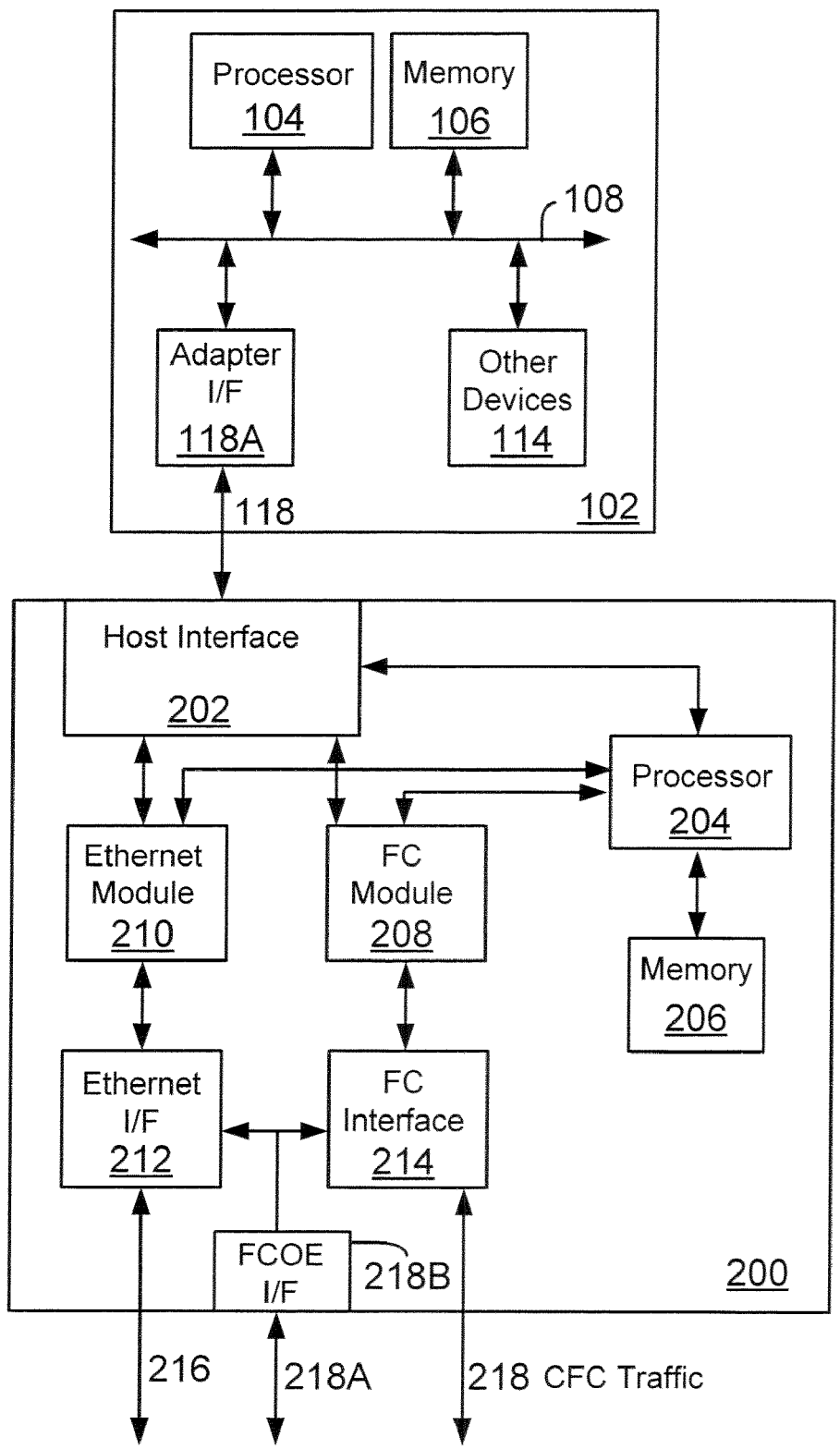
FIG. 2 shows a block diagram of an adapter for handling both network and storage data, according to one embodiment.

In one embodiment, an integrated network and storage adapter is provided that can handle network and storage protocols. The adapter is referred to herein as a Fibre Channel over Ethernet (FCOE) adapter that can handle both network (for example, Ethernet) and storage (for example, Fibre Channel) traffic efficiently. FIG. 2 shows a block diagram of an FCOE adapter 200, which is coupled to host system 102 via link 118, and adapter interface 118A.

FCOE adapter 200 interfaces with host system 102 via host interface 202. In one embodiment, host interface 202 is a PCI Express interface coupled to a PCI Express link 118.

POOP adapter 200 includes a processor 204 that executes firmware instructions out ory 206 to control overall POOP adapter 200 operations.

FCOE adapter 200 includes an Ethernet interface 212 that may transmit and receive network packets via link 216. POOP Adapter 200 also includes an Ethernet Module 210 that interfaces with Ethernet interface 212 and host system 102 to process packets in the receive path (i.e. from the network 128) and the transmit path (i.e. packets sent to the network 128).

FCOE adapter 200 further includes a PC interface 214 that may receive Fibre Channel traffic from FC SAN 132 and sends information out to Fibre Channel SAN 132. FC module 208 interfaces with both Interface 214 and host system 102 to send and receive Fibre Channel frames.

In FIG. 2, although separate links (216 and 218) are shown for network and storage related traffic, a single link 218A may be used to route network/storage packets (i.e. FCOE packets). FCOE packets are initially received by FCOE I/F 218B and then routed to Ethernet I/F 212 or FC Interface 214.

FCOE Header:

FIG. 3 shows a block diagram of a FLOE header format 300 used to process network and storage traffic. FCOE header 300 includes an Ethernet header 302. In one embodiment, the Ethernet header 302 may be 14 bytes in length. Start of frame (SOF) 304 indicates the beginning of a frame and may be 1 byte. Field 306 that may be 2 bytes long specifies the POOH packet length. The Fibre Channel header (FC Header) 308 is 24 bytes long with 30 bytes of payload 310. The cyclic redundancy code (CRC) 312 may be 4 bytes and the end of frame (HOF) 42 may be 1 byte in size.

Overall Software Structure:

FIG. 4A shows a top-level software architecture that may be used for handling FCOE packets. Operating system 400 is executed at a host system (for example, 102). Application 402 initiates storage based commands (for example, to write or read data) that are sent to the FCOE adapter 200 via a FCOE driver 404 that is executed at the host system. Processor 204 executes firmware 406 to control over FCOE adapter 200

FIG. 4B shows an example of FCOE driver 404 components. FCOE driver 404 includes an operating system I/O interface 408 that interfaces with operating system 400. OS Interface 408 translates I/O (read and write requests) to Fibre Channel requests. A Fibre Channel Protocol Interface LAYER (FC Protocol I/F) 409 handles Fibre Channel protocol based operations at a driver level.

FCOE driver 404 includes a physical or hardware interface layer (Phy layer) 410 that interfaces with Ethernet module 210. Phy layer 410 may be implemented in firmware depending on the actual software/hardware configuration, described below.

Software Initiator

FIGS. 5A-5F show examples of software initiators for handling network/storage traffic (for example, FCOE) in different operating system environments, for example, Windows based operating systems, Linux based operating systems and Solaris based operating systems. The examples are only to illustrate the adaptive aspects of the embodiments disclosed herein and are not intended to limit the scope of the disclosure to any particular operating system, protocol or network environment.

Figure 5A:
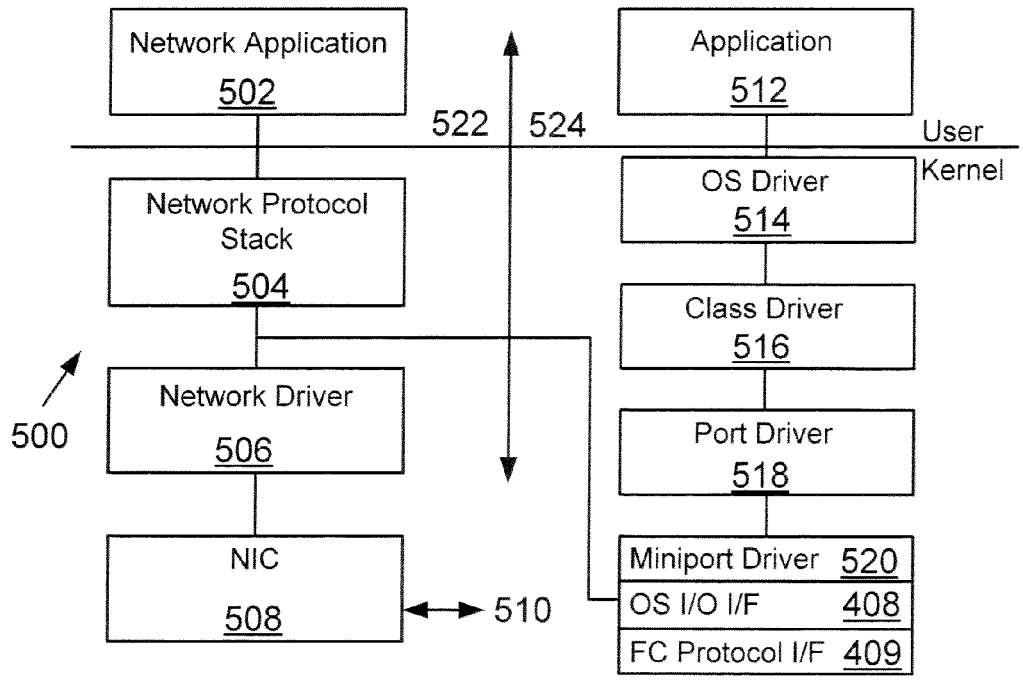
FIGS. 5A-5F and 6A-6B show examples of software initiators according to the various embodiments of the present disclosure.

FIG. 5A shows a functional block diagram of system 500 used for enabling network/storage traffic using adapter 200, according to one embodiment. System 500 includes a network stack 522 and storage stack 524

Figure 5B:
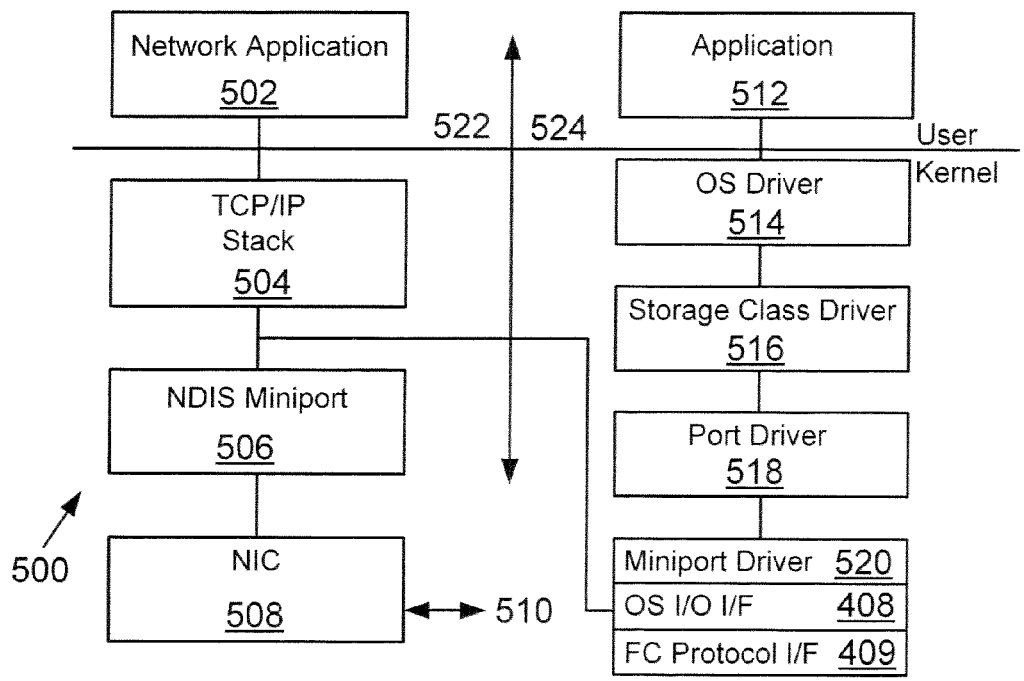

Network stack 522 may include a network-based application 502 (shown as network application 502) that initiates and receives network information. Network application 502 interfaces with a network protocol stack (also referred to as protocol stack) 504. In one embodiment, protocol stack 504 may be a TCP/IP stack (as shown in FIG. 5B) used for sending and receiving network information (which includes data and commands) via a network link (for example, an Ethernet link).

Protocol stack 504 sends and receives net information to and from a network driver 506. In one example, network driver 506 may be an enhanced NDIS miniport driver (FIG. 5B) used in Windows® based operating system environments. Network driver 506 interfaces with a NIC 508 that sends and receives network/storage related traffic via a link

510. Network driver 506 interfaces with an enhanced miniport driver 520 in the storage stack 524, as described below.

Storage stack 524 includes an application 512 that is executed in the user space. Application 512 interfaces with operating system driver 514. Operating system driver 514 includes a standard file system driver and a partition driver.

When application 512 issues an I/O request, for example, a read command, for a file that may be stored at a storage device, the operating system invokes storage class driver (or class driver) 516 to translate the I/O request for a next layer (i.e. port driver 518). In one embodiment, class driver 516 translates a received I/O packet with system defined SCSI request blocks (SRBs) containing SCSI command descriptor blocks.

The translated packets are then sent to port driver 518, which may be a SCSI port driver that translates the SRBs received from class driver 516 and passes the SRBs and command descriptor blocks (CDBs) to enhanced miniport port driver 520.

In one embodiment, miniport driver 520 may include OS I/O interface (may also be referred to as OS I/F) 408 and storage protocol interface 409 (for example, FC protocol interface 409 (See FIG. 5B). OS interface 408 translates an I/O request to a storage protocol request (for example, Fibre Channel request) and interfaces with storage protocol interface 409. Storage Protocol interface 409 handles storage protocol functionality so that application 512 can communicate with a storage device (for example, a Fibre Channel based storage device).

Miniport driver 520 routes storage protocol based I/O requests to enhanced network driver 506 that interfaces with NIC 508. Network driver 506 wraps the I/O request into a network/storage packet (for example, an FCOE packet) and sends the encapsulated packet to NIC 508. The FCOE packet is then transmitted another network device via network link 510.

FIG. 5B is similar to FIG. 5A, except the various modules are based on a Windows operating system, Fibre Channel, SCSI, TCP/IP and Ethernet protocols.

Figure 5C:
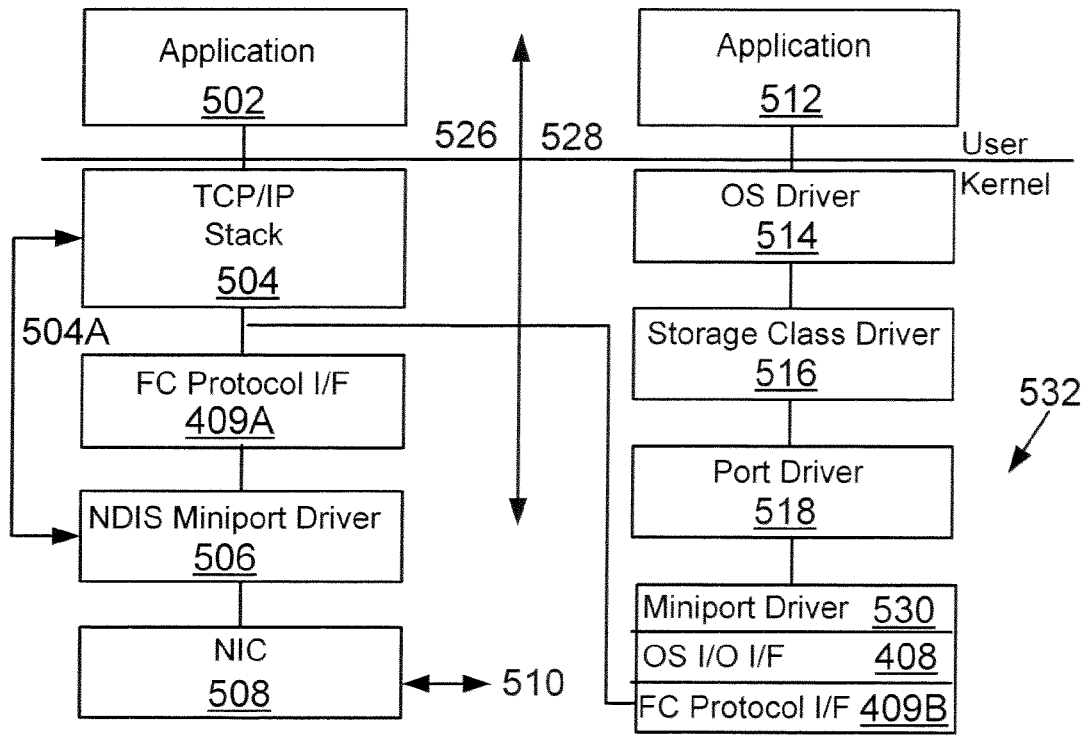

FIG. 5C shows a block diagram of a software system 532 with network stack 526 and storage stack 528. Various components shown in FIGS. 5A and 5B described above are also used in FIG. 5C but are not described again with respect to FIG. 5C.

In system 532, FC protocol interface 409 is split into two components (or modules, used interchangeably throughout this specification), 409A and 409B. FC Protocol I/F 409A interfaces with network driver 506 (for example, enhanced NDIS miniport driver 506).

Incoming encapsulated network/storage packets that are received by NIC 508 are first processed by network driver 506. The network related information is passed directly to network protocol stack 504 via bi-directional entry point 504A.

The storage related frames (for example, Fibre Channel frames) are passed to FC protocol interface 409A that performs initial processing of Fibre Channel frames, for example, FCOE frame filtering, cyclic redundancy code (CRC) validation and FCOE header/trailer processing. The processed Fibre Channel frames are then passed onto module 409B in enhanced miniport driver 530. Before passing the I/O related information to port driver 518 and subsequently to application 512, Module 409B performs various functions. For example, for I/O related frames, Module 409B processes the Fibre Channel header, identifies an Exchange and its associated SCSI Request Block, places read data/status information at an appropriate buffer location (not shown) and completes the SRB. For non-I/O related frames, module 409B process FC target rediscovery if state change notification is received, handles login/logout/link up/link down related events and handles other task management functions, for example, abort task, reset LUN (logical unit number), reset a target and reset a bus.

Outgoing network and storage information is encapsulated in an FCOE packet by network driver 506 and passed to NIC for transmission via link 510. For outgoing packets, modules 409A and 409B split the FC related functions.

Figure 5D:
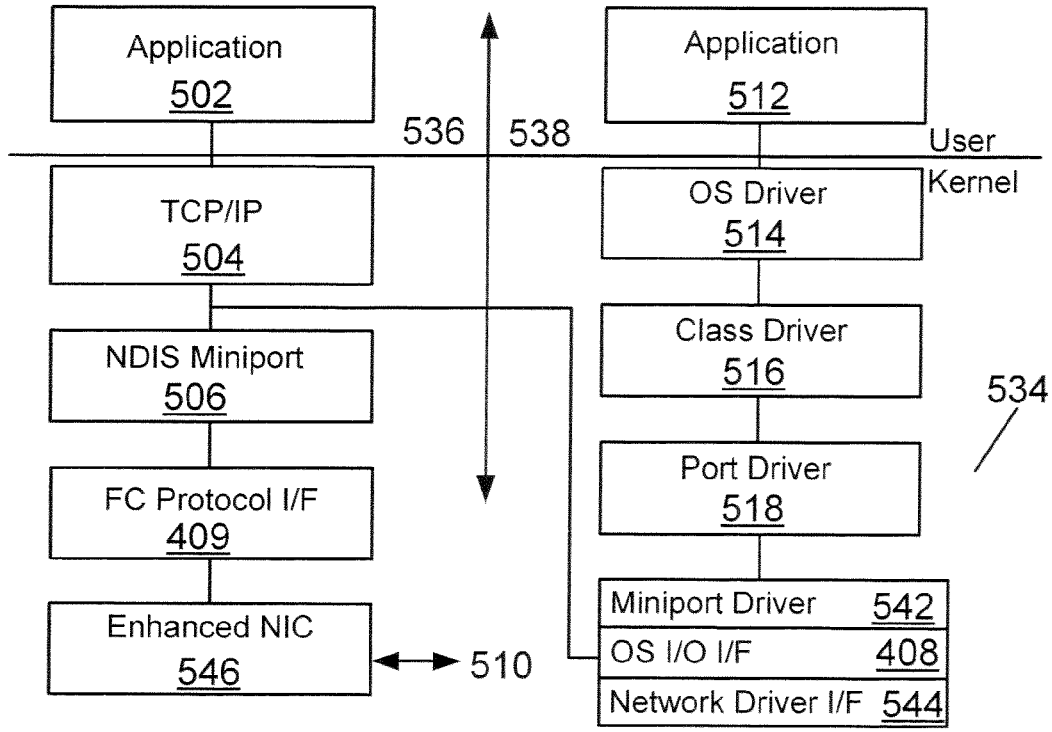

FIG. 5D shows a system 534 with an enhanced NIC 546 that includes FC protocol interface 409. System 534 includes a network stack 536 and storage stack 538. In system 534, miniport driver 542 in storage stack 538 includes a network driver interface 544 to communicate with NDIS Miniport driver 506.

Outgoing I/O requests are received by OS I/O interface 408 and then passed to NDIS Miniport driver 506 and thereafter to FC protocol interface 409 that performs all Fibre Channel related operations.

Network commands and data are also received by NDIS Miniport driver 506 and passed to enhanced NIC 546. Enhanced NIC 546 and NDIS miniport driver 506 encapsulate the FC commands.

FCOE frames received from link 510 are initially processed by enhanced NIC 546. The Fibre Channel operations are performed by FC Protocol Interface 409. After being processed by FC protocol interface 409, the Fibre Channel frames are sent to network driver 506 and then moved to enhanced miniport driver 542 so that can be delivered directly to application 512.

The network frames (for example, Ethernet Frames) are moved up the network stack to application 502.

Figure 5E:
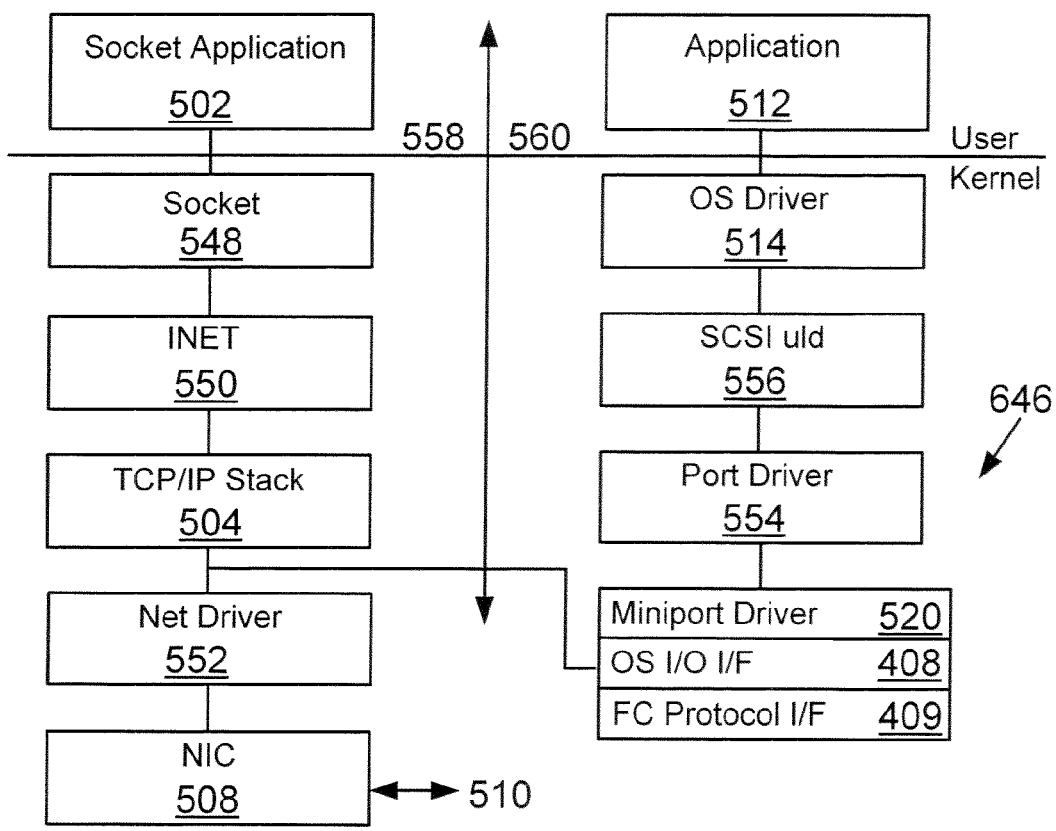

FIG. 5E shows a system 646 with a network stack 558 and storage stack 560. System 646 is similar to system 500 (FIG. 5B), except, system network stack 558 shows components and modules that are used in a Linux operating system environment. For example, socket layer 548 and INET layer 550 are Linux network interface to a TCP/IP layer 504. Netdriver 552 is comparable to NDIS Miniport driver 506.

In the storage stack, layers 556 and 554 are comparable to layers 516 and 518, respectively.

Figure 5F:
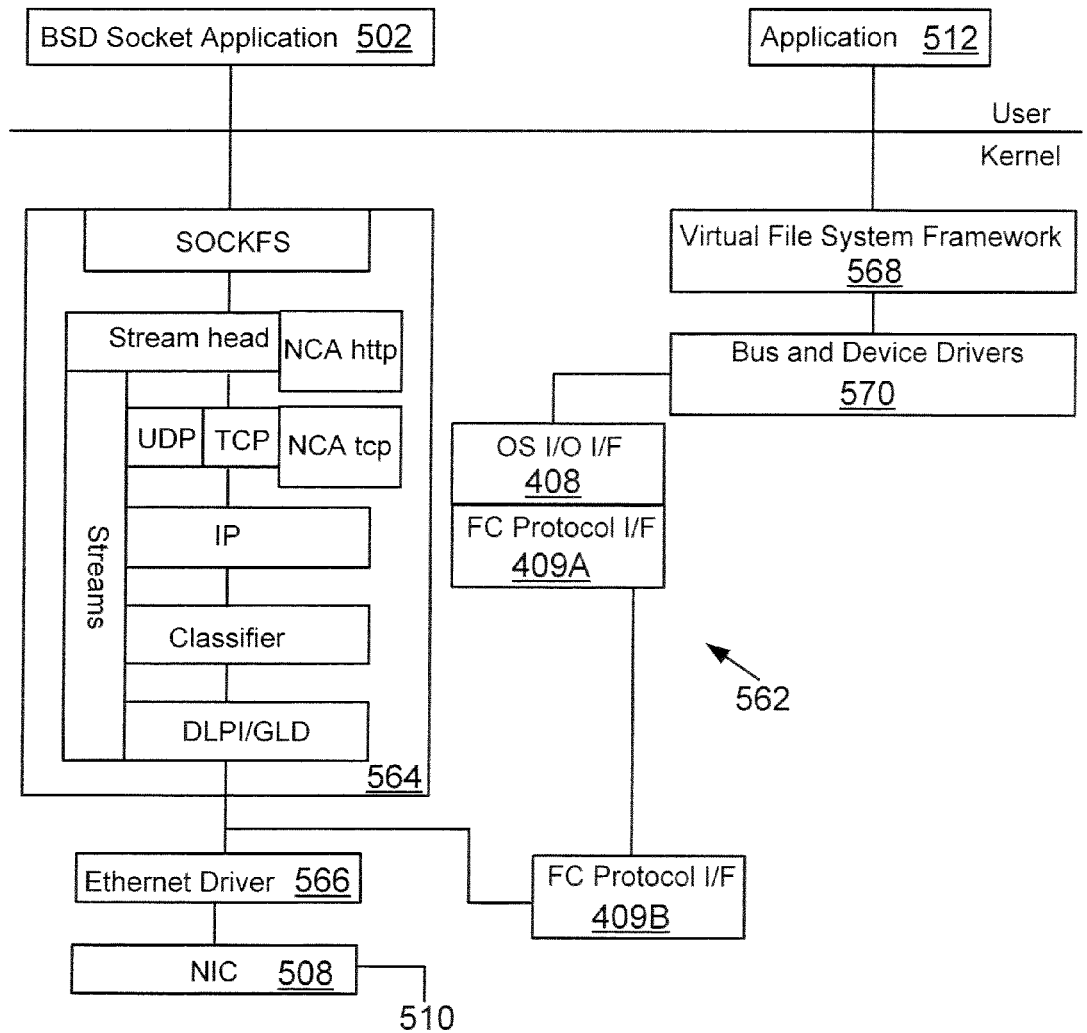

FIG. 5F shows a block diagram of system 562 that may be used in a Solaris operating system environment. In system 562, Solaris stack 564 includes a protocol stack 504 (for example, the TCP/IP stack). Ethernet driver 566 is similar to NDIS Miniport driver 506. Bus and device drivers 570 are similar to drivers 516 and 518. The virtual File system framework 568 is similar to OS driver 514.

Figure 6A:
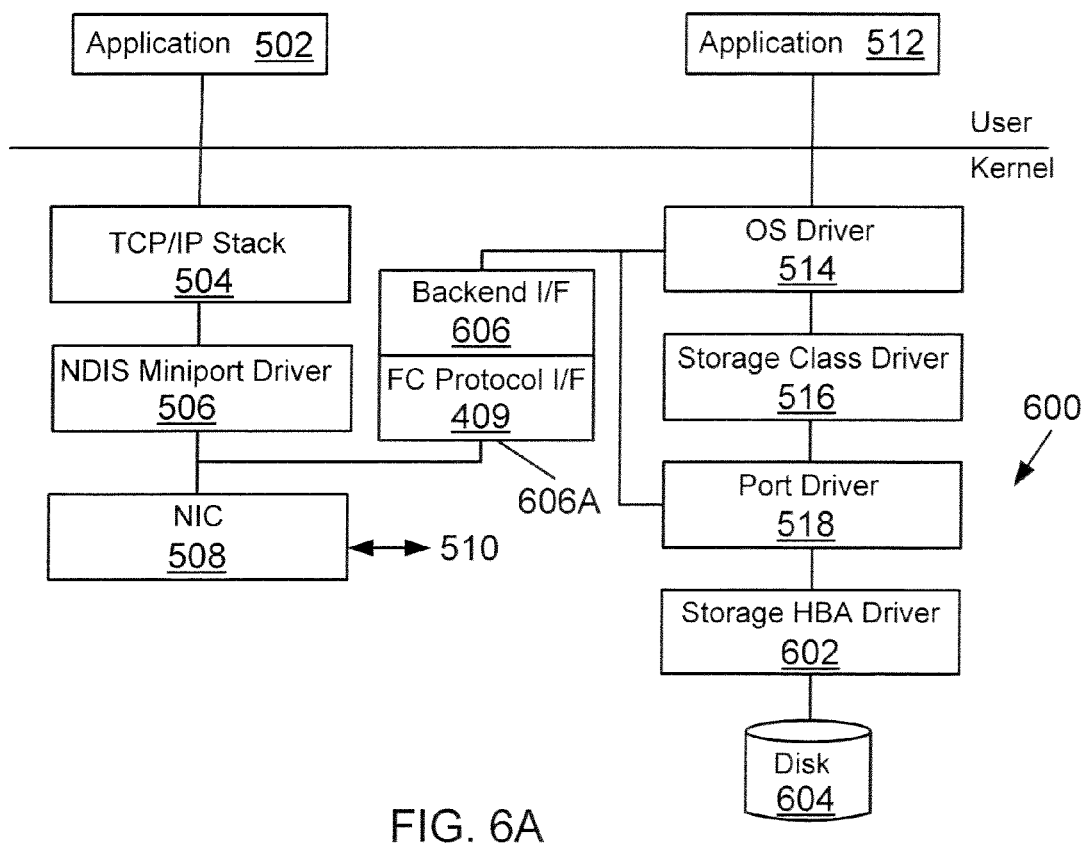
Figure 6B:
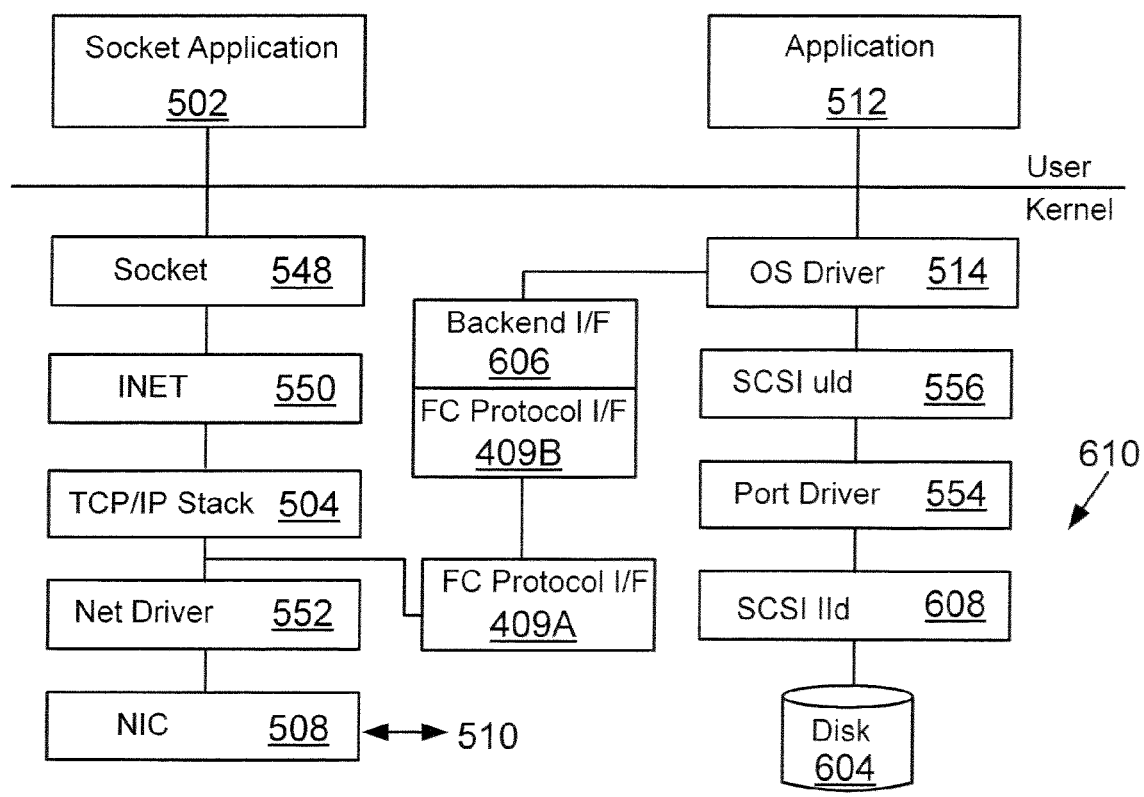

FIGS. 6A and 6B show examples of target software initiators in both the Windows and Linux environments. The target initiators use various common modules that have been described above with respect to FIGS. 5A-5F.

FIG. 6A shows a system 600 in the Windows operating system environment. Incoming FCOE frames are received by NIC 508. NDIS Miniport driver passes the storage-related frames (i.e. Fibre Channel frames and the SCSI commands) to software module 606A that may include a backend interface module 606 and FC protocol interface 409. FC protocol interface 409 performs the Fibre Channel related operations and the backend interface module 606A performs various operations, in a target mode, for example, SCSI/storage commands such as read/write/inquiry/report luns/mode sense/mode select.

Commands and status information are routed by backend interface 606 to application 512 using operating system driver 514; while data is sent to storage 604 via storage driver 602.

FIG. 6B shows a block diagram of system 610 that operates in a target Linux environment. SCSI layer 608 performs functions that are similar to port driver 518.

Figure 7A:
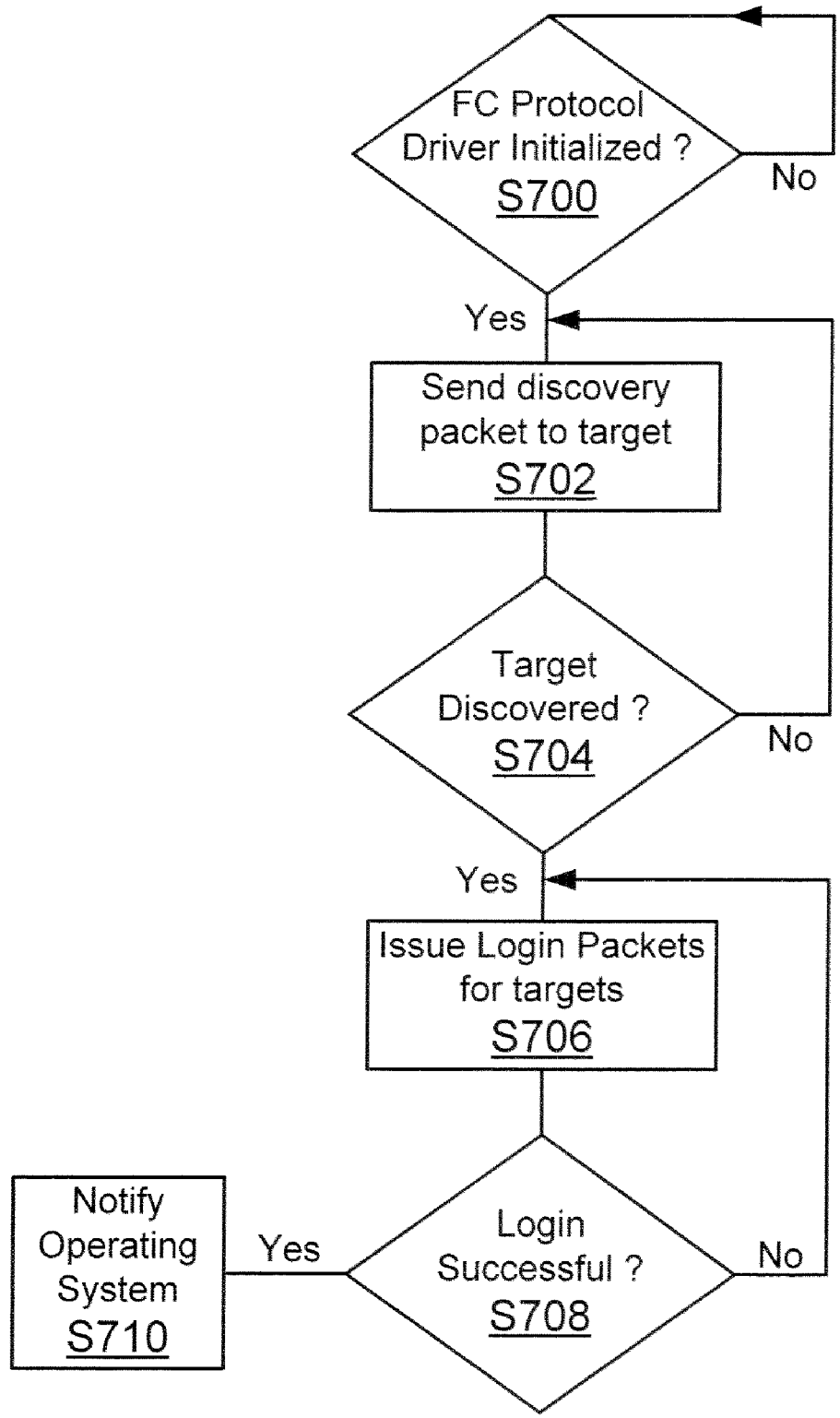
FIG. 7A shows a process flow diagram for initializing a system according to one embodiment.

Process Flow:

FIG. 7A shows a process flow diagram for initializing the systems described above.

The process starts in step S700, when the process determines if FCOE driver (for example, 404, FIG. 4B) is initialized. If yes, then in step S702, discovery packet is sent to a target. The discovery packet is intended to get information from a target. If FCOE driver is not initialized, the process waits for it to initialize.

In step S704, the process determines if target has been discovered. If no targets are discovered, the process reverts back to step S702.

After a target is discovered, log in packets are issued to the target in step S706. The login packets comply with the Fibre Channel standards.

In step S708, the process determines if target login is successful. If yes, then the operating system is notified of the discovery.

Figure 7B:
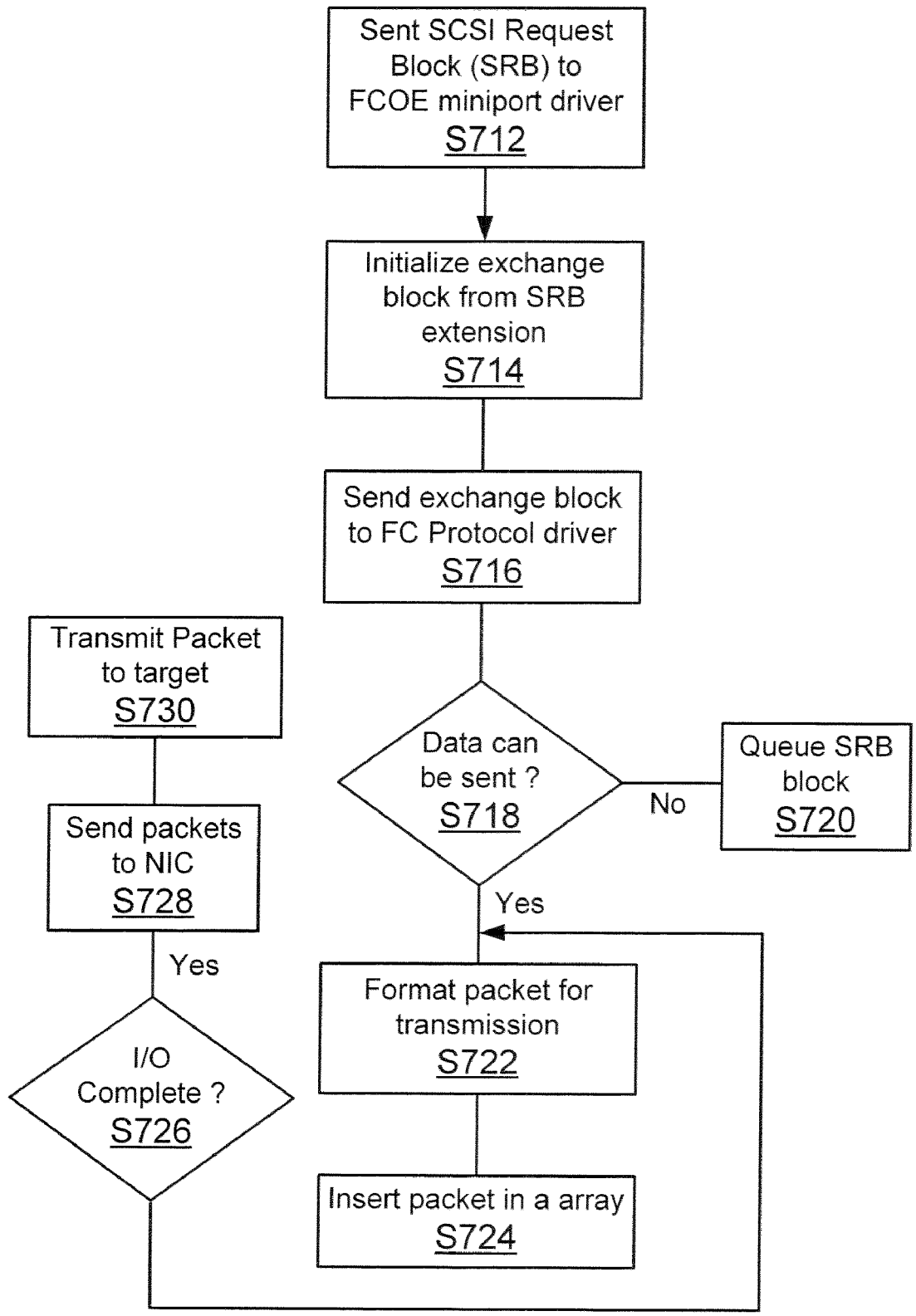
FIG. 7B shows a process flow diagram for transmitting encapsulated FCOE packets, according to one embodiment.

FIG. 7B shows a process flow diagram for sending encapsulated FCOE packets, according to on embodiment. The process starts in step S712, when a SCSI request block (SRB) is received by a FCOE miniport driver (for example, 520, FIG. 5A). In step S714, the exchange block from SRB extension is initialized.

Figure 10:
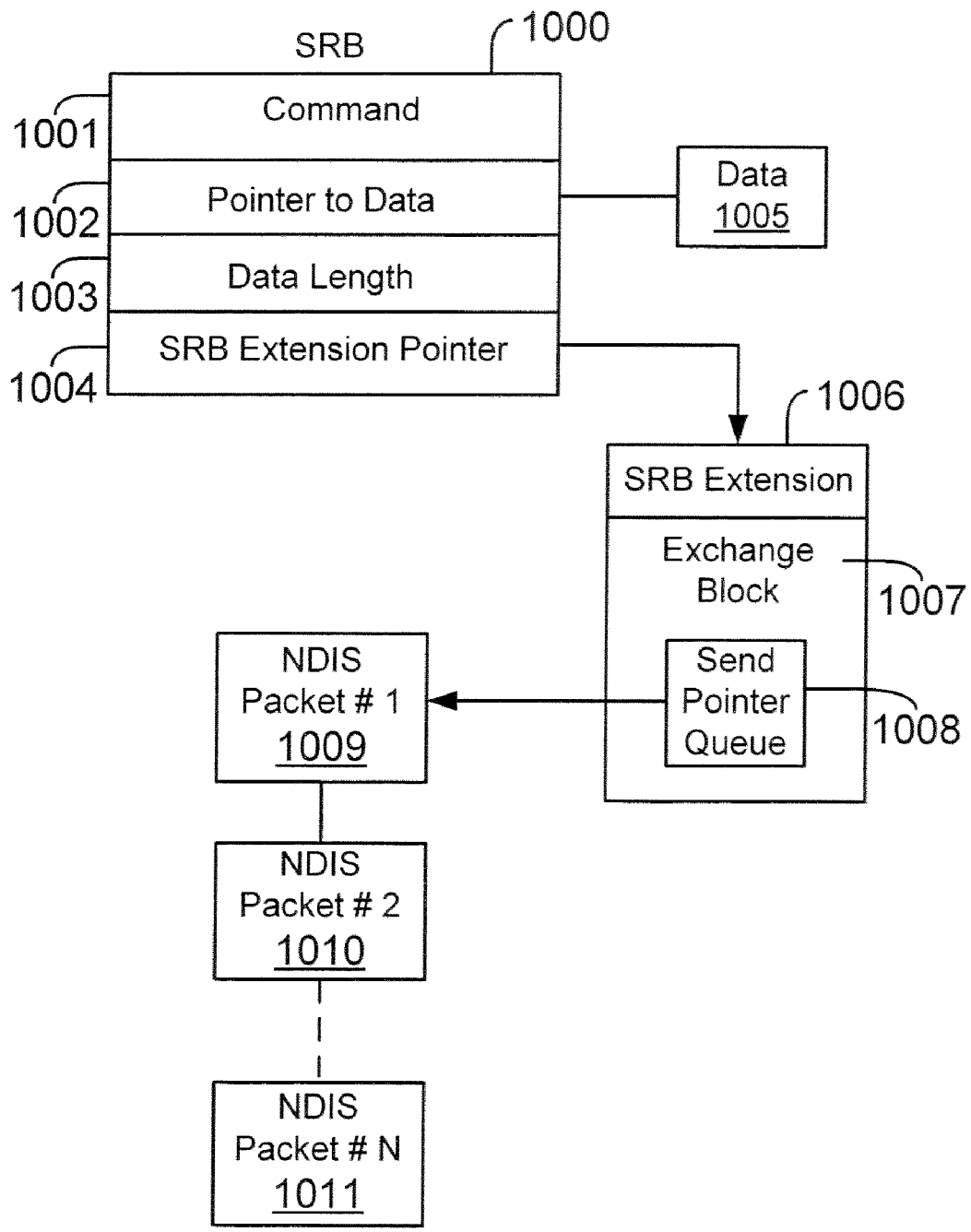
FIG. 10 shows an example of a request block used according to one embodiment.

FIG. 10 shows an example of a SRB 1000 that includes a command 1001, a pointer 1002 to stored data 1005, data length 1003 and a SRB pointer extension 1004. SRB extension 1006 includes an exchange block 1007 that includes a send pointer queue 1008. The send pointer queue 1008 points to a plurality of NDIS packets shown as 1009, 1010 and 1011.

In step S716, the exchange block (for example, 1007, FIG. 10) is sent to FC Protocol interface 409. In step S718, the process determines if data can be sent. If not, then the SRB is queued in step S720.

If data can be sent, then in step S722, the FC packet is formatted for transmission. The PC protocol interface 409 formats the Fibre Channel frame. NDIS Miniport driver 506 encapsulates the FC frame itself in a FCOE frame.

In step S724, the FCOE packet is inserted in an array. In Step S726, the process determines if the I/O processing is complete. If yes, then in step S728, the packet is sent to NIC 508. Thereafter, the packet is transmitted to the target in step S730.

Figure 8:
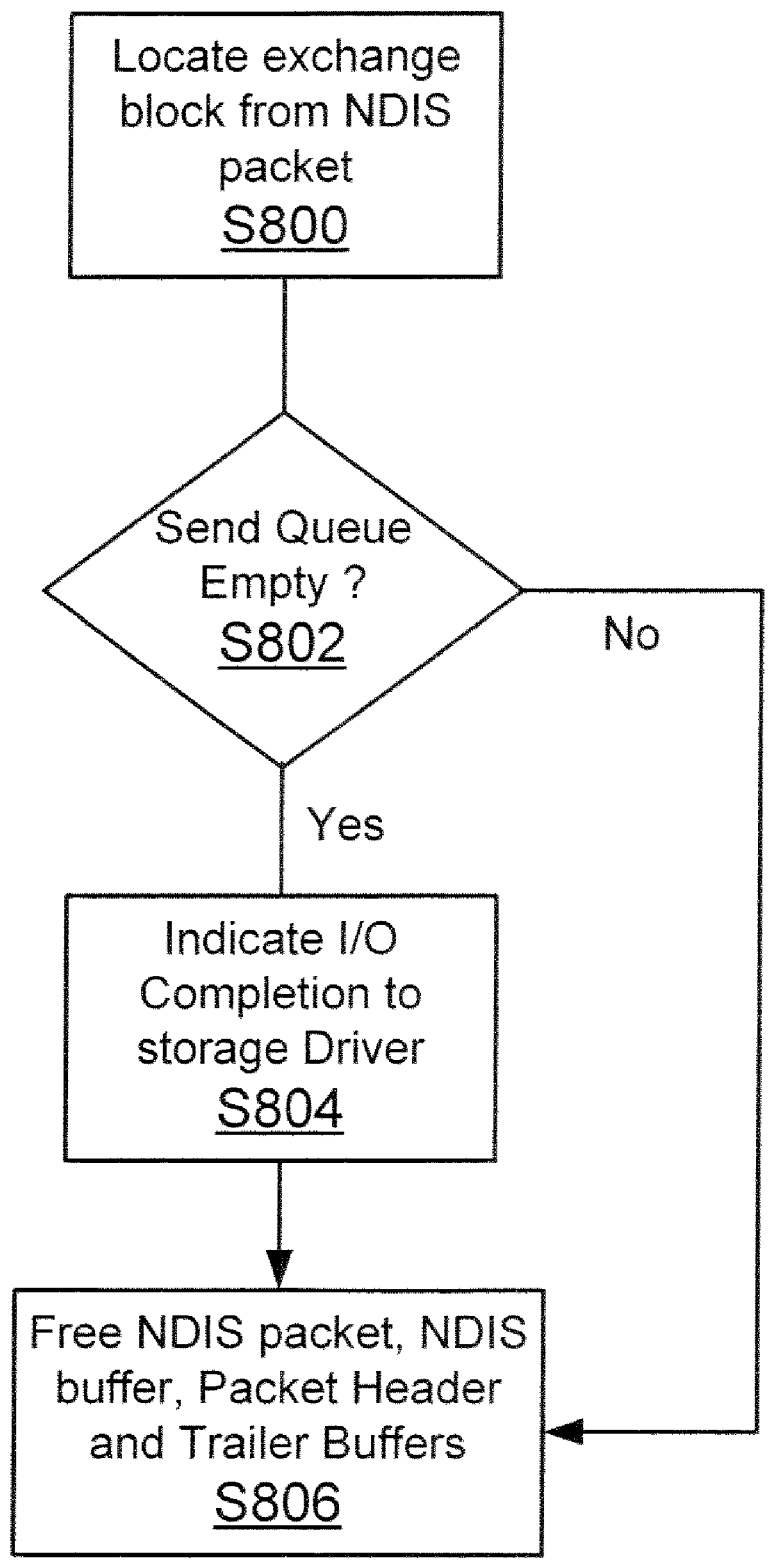
FIG. 8 shows a process flow diagram for managing a completion request, according to one embodiment.

FIG. 8 shows a flow diagram for managing a send completion process, according to one embodiment. The process starts in step S800, when an exchange block is located from an NDIS packet (See FIG. 10).

In step S802, the process determines if the send queue for sending packets is empty. If yes, then I/O completion is indicated to the storage driver (for example, Miniport driver 520, FIG. 5B) in step S804. Thereafter, in step S806, the NDIS packet, NDIS buffer and any other memory resource associated with the NDIS packets are released so that they can be used by other packets. If send queue is not empty in Step S802, the process moves to step S806.

Figure 9:
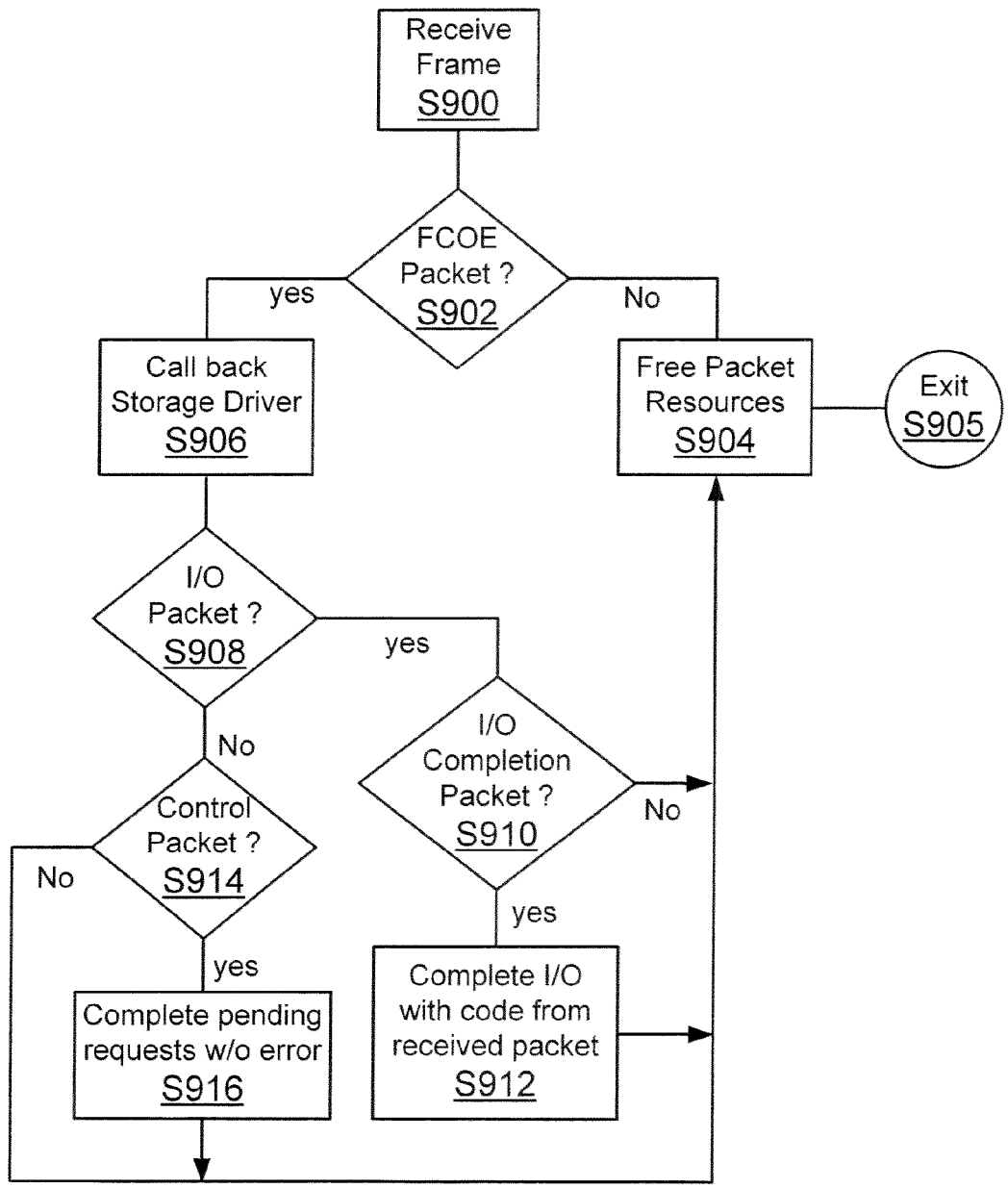
FIG. 9 shows a process flow diagram for processing network and storage packets, according to one embodiment.

FIG. 9 shows a process flow diagram for processing network/storage packets (FCOE), according to one embodiment. The process starts in step S900, when adapter 200 receives a frame. The frame is routed by NIC 508 to network driver 506. The network driver 506 passes the frame to miniport driver 520.

In step S902, the FC Interface 409A (FIG. 5C) determines if the frame is a FCOE frame. If not, then in step S904, the buffers associated with the frame are released and the process ends in step S905.

If the frame is a FCOE frame, then in step S906, miniport driver 520 (or 530/542) is initialized.

In step S908, the process determines if the received frame is an I/O packet. If yes, then in step S910, the process determines if the I/O packet is a completion packet. If it is a completion packet, then in step S912, using the code in the packet completes the I/O and the process moves to step S904. If not an I/O completion packet (step S910), then the process moves to step S904.

If it is not an I/O packet in step S908, then in step S914, the process determines if it is a control packet. If it is a control packet, then in step S916, the pending request is completed and the process moves to step S904. If it is not a control packet, then the process moves to step S904.

The foregoing process steps are described with respect to Fibre Channel, Ethernet and Windows operating system, as an example only, but are not intended to limit the scope of this disclosure to any particular protocol or operational environment.

Although the present disclosure has been described with reference to specific embodiments, these embodiments are illustrative only and not limiting Many other applications and embodiments of will be apparent in light of this disclosure.

What is claimed is:

1. A system comprising:
a computing system executing a storage application for sending an input/output (I/O) request for communicating with a storage device, the storage application transmits the I/O request to a storage driver that includes (a) an operating system interface to translate the I/O request to a storage protocol and to communicate with an operating system executed by the computing system, and (b) a storage protocol interface that executes operations related to the storage protocol for processing the I/O request such that the application can communicate with the storage device;
wherein the storage driver sends the I/O request to a network driver that encapsulates the I/O request into a combined network and storage packet; and
the encapsulated network and storage packet is transmitted via a network link using a network protocol.

2. The system of claim 1, wherein the storage protocol is Fibre Channel.

3. The system of claim 2, wherein the network protocol is Ethernet.

4. The system of claim 3, wherein the encapsulated packet is a Fibre Channel over Ethernet (FCOE) packet.

5. The system of claim 1, wherein the network link is an Ethernet link.

6. The system of claim 1, wherein the computing system executes a network stack for processing Transmission Control Protocol/Internet Protocol (TCP/IP) packets.

7. The system of claim 1, wherein the storage protocol interface is a Fibre Channel interface.

8. The system of claim 7, wherein the Fibre Channel interface is partially executed by the storage protocol driver and partially executed within a network protocol stack.

9. The system of claim 7, wherein the Fibre Channel interface is entirely executed within a network protocol stack.

10. A method for sending a storage packet encapsulated within a network packet, comprising:
receiving an input/output (I/O) request for communicating with a storage device from an application executed by a computing system; wherein the I/O request is received by a storage driver that includes an operating system interface to translate the I/O request to a storage protocol;

performing storage protocol-related operations for the I/O request, wherein a storage protocol interface formats the I/O request such that the application can communicate with the storage device;

the storage driver sending the I/O request to a network driver;

the network driver encapsulating the I/O request in a combined network and storage packet; and transmitting the encapsulated network and storage packet via a network link using a network protocol.

11. The method of claim 10, wherein the storage protocol is Fibre Channel.

12. The method of claim 11, wherein the network protocol is Ethernet.

13. The method of claim 12, wherein the encapsulated packet is a Fibre Channel over Ethernet (FCOE) packet.

14. The method of claim 11, wherein the network link is an Ethernet link.

15. The method of claim 10, wherein the computing system executes a network stack for processing Transmission Control Protocol/Internet Protocol (TCP/IP) packets.

16. The method of claim 10, wherein the storage protocol interface is a Fibre Channel interface.

17. The method of claim 16, wherein the Fibre Channel interface is partially executed by the storage protocol driver and partially executed within a network protocol stack.

18. The method of claim 16, wherein the Fibre Channel interface is entirely executed within a network protocol stack.

* * * * *

UNITED STATES PATENT AND TRADEMARK OFFICE
CERTIFICATE OF CORRECTION

| | | |
|---|---|---|
| PATENT NO. | : 7,908,404 B1 | Page 1 of 1 |
| APPLICATION NO. | : 12/052130 | |
| DATED | : March 15, 2011 | |
| INVENTOR(S) | : Ying P. Lok et al. | |

It is certified that error appears in the above-identified patent and that said Letters Patent is hereby corrected as shown below:

In column 1, line 24, before "system" insert -- a --.

In column 2, line 3, before "a" insert -- of --.

In column 2, line 40, delete "a" and insert -- data --, therefor.

In column 3, line 29, delete "12" and insert -- 112 --, therefor.

In column 3, line 56, delete "POOP" and insert -- FCOE --, therefor.

In column 3, line 57, delete "ory" and insert -- of memory --, therefor.

In column 3, line 65, delete "PC" and insert -- FC --, therefor.

In column 4, line 1, after "both" insert -- FC --.

In column 4, line 14, delete "POOH" and insert -- FCOE --, therefor.

In column 4, line 18, delete "(HOF)" and insert -- (EOF) --, therefor.

In column 4, line 52, delete "524" and insert -- 524. --, therefor.

In column 4, line 62, delete "net" and insert -- network --, therefor.

In column 5, line 36, before "another" insert -- of --.

In column 6, line 32, after "that" insert -- it --.

In column 7, line 16, before "target" insert -- a --.

In column 7, line 26, delete "on" and insert -- one --, therefor.

In column 7, line 42, delete "PC" and insert -- FC --, therefor.

Signed and Sealed this
Sixteenth Day of August, 2011

David J. Kappos
*Director of the United States Patent and Trademark Office*